Feb. 8, 1949.  H. L. WHITE  2,461,100
ADAPTER JOINT FOR PIPES
Filed Feb. 16, 1945  2 Sheets-Sheet 1
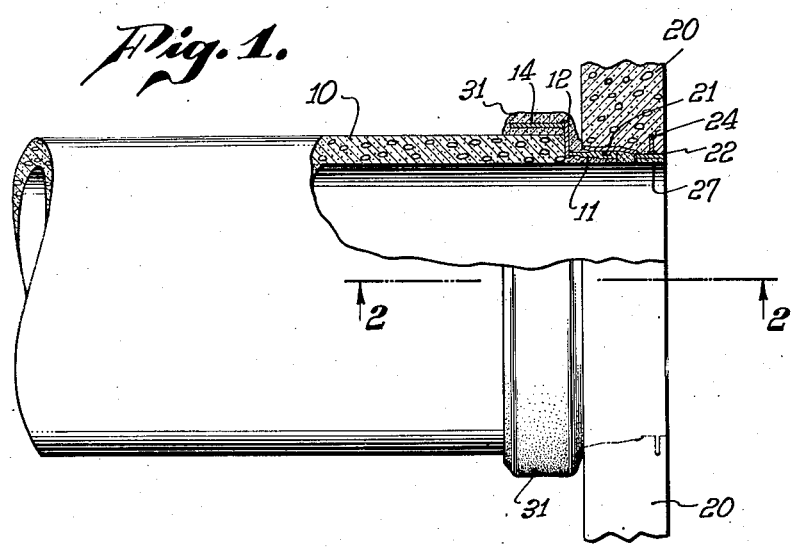
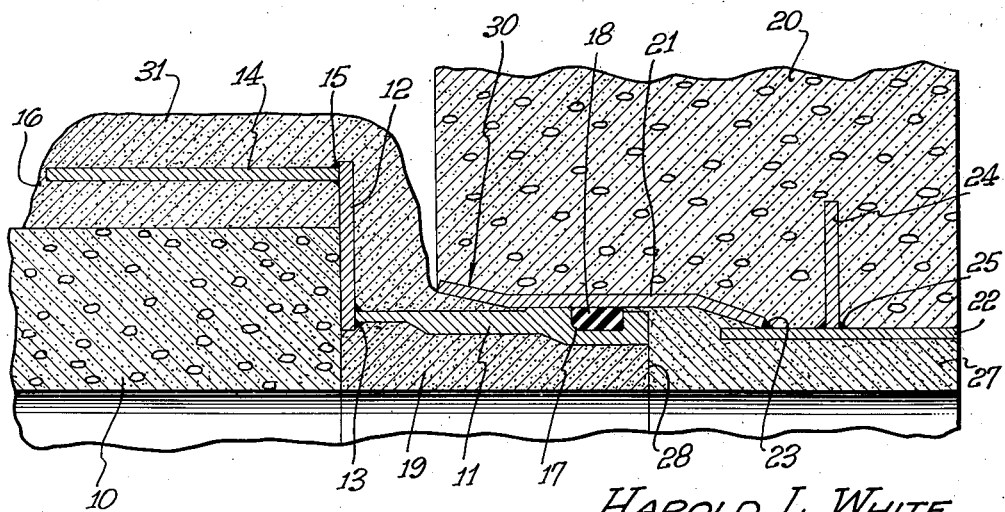
HAROLD L. WHITE,
INVENTOR.
BY [signature]
ATTORNEY.

Feb. 8, 1949.  H. L. WHITE  2,461,100
ADAPTER JOINT FOR PIPES
Filed Feb. 16, 1945  2 Sheets-Sheet 2

HAROLD L. WHITE,
INVENTOR.
BY
ATTORNEY.

Patented Feb. 8, 1949

2,461,100

UNITED STATES PATENT OFFICE 2,461,100

ADAPTER JOINT FOR PIPES

Harold L. White, San Marino, Calif., assignor to American Pipe and Construction Co., a corporation of Delaware Application February 16, 1945, Serial No. 578,215

5 Claims. (Cl. 285—112)

This invention relates to an adapter joint for connecting the end of a pipe to some form of rigid structure.

This joint is designed for forming a connection between two structures such as, for instance, a cement pipe and a junction chamber, a valve box or other rigid structure where there is a probability of differential settlement or unequal movement between the pipe and such structure. Such movement is generally not large in terms of inches but it is great enough to cause the cracking of a rigid structure or the breaking of the back of the adjoining pipe. Such cracking is dangerous inasmuch as sufficient leakage may result as to cause a washout of one or both of the adjoining structures, resulting in a repair job that is not only difficult but expensive.

It is the object of this invention to provide an adapter joint of simple form and construction by means of which the end of the pipe may be joined to a rigid structure so as to allow for differential settlement between the pipe and structure without impairing either the pipe or such structure.

Other objects and advantages will appear hereinafter from the following description and drawings.

Referring to the drawings, which are for illustrative purposes only:

Fig. 1 is an elevational view of the end of a pipe section showing a form of adapter joint connecting the pipe section to a rigid structure such as a chamber of any kind into which the pipe discharges;

Fig. 2 is an enlarged sectional view on line 2—2, Fig. 1;

Figure 3:
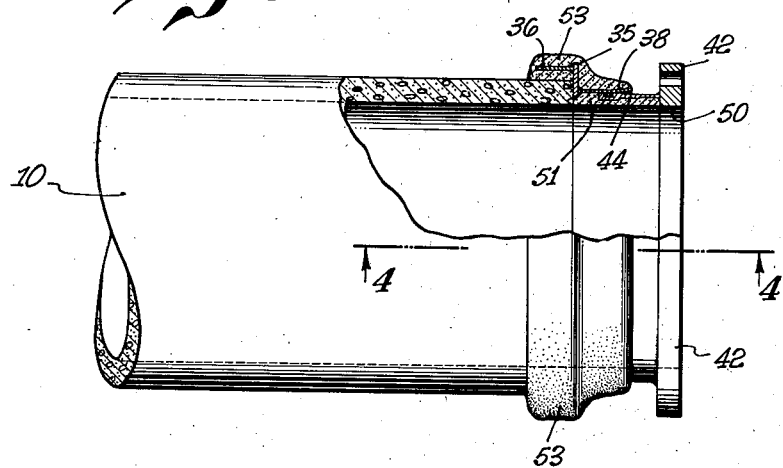
Fig. 3 is an elevational view partly in section showing a modified form of the joint connecting the end of the pipe section to a metal flange such as may be used for attachment to a valve or other structure.

Referring more particularly to the drawings and to the form of adapter joint shown in Figs. 1 and 2, 10 indicates the end of a concrete pipe section. In this form of my invention is illustrated an adapter provided with a spigot ring indicated at 11. The inner end of this ring is welded to a circular plate 12 as indicated at 13. This circular plate is placed against the end of the pipe section 10 and is provided with a cylindrical band or member 14 welded to the outer portion of the ring 12 as indicated at 15. This cylindrical ring 14 extends over the end of the pipe section, the space between the ring or band 14 and the pipe being filled in with neat cement caulking, as illustrated at 16.

The spigot ring 11 is provided with an external groove indicated at 17 for receiving a continuous elastic band or member 18. When the spigot assembly is secured to the end of the pipe section 10 as above described, the inner face of the spigot ring 11 from the end of the pipe 10 to the end of the ring 11 is filled in to the inner diameter of the pipe with cement mortar indicated at 19, the inner face of the cement mortar lining being finished off to the same diameter as the inner diameter of the pipe section.

20 designates a fixed member, as illustrated, constituting the concrete wall of a junction chamber or similar structure. Mounted in this wall is a bell assembly for receiving the spigot assembly of the end of the pipe section. This bell assembly comprises a bell ring indicated at 21, the inner end of which is welded to a cylindrical ring 22 as indicated at 23. The bell ring 21 and cylindrical ring 22, which may be considered a unitary member, are placed within an opening formed in the wall structure and through which the contents of the pipe is to be discharged into the chamber, the cylindrical ring being reinforced and securely held in place by means of a circular flange indicated at 24, the inner edge of which rests upon and is welded to the ring 22 as indicated at 25.

The inner face of the ring 22 and bell ring 21 is filled in with cement mortar lining indicated at 27. This extends part-way through the opening in the wall and forms a shoulder indicated at 28 against which the spigot ring of the pipe abuts. The connection between the pipe and stationary member is made by telescoping the spigot ring 11 of the pipe into the bell ring 21 of the structure, such bell ring being flanged outwardly at the entrance into the pipe as indicated at 30 to facilitate the insertion of the spigot ring. As the spigot ring 11 slips into the bell ring the rubber band 18 is compressed, forming a tight joint between the two structures and allowing for some angular movement between the pipe and other structure, it being understood that the end of the spigot ring 11 engages the shoulder 28 formed in the structure by the lining indicated at 27. After the two structures have been joined as just described a cement mortar coating indicated at 31 is placed around the exposed portion of the adapter on the end of the pipe.

Figure 4:
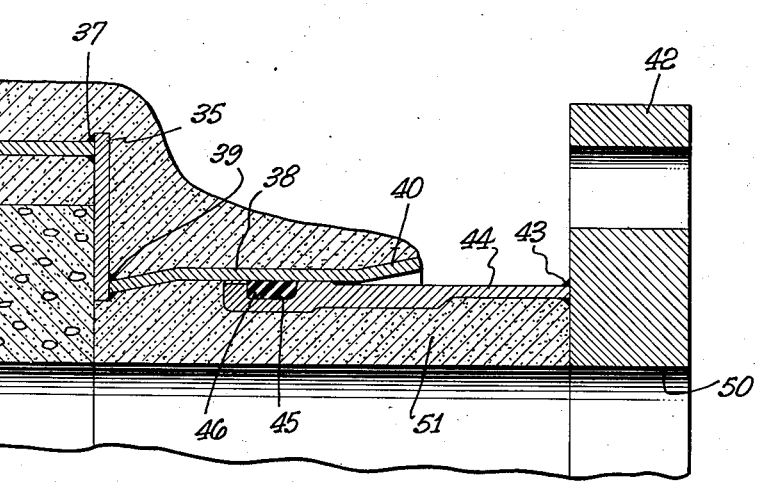
Fig. 4 is an enlarged sectional view on line 4—4, Fig. 3.

In the form of my invention shown in Figs. 3 and 4 the cement pipe is shown attached to a structure connecting member such as a flange which is adapted for connecting the pipe to a valve. As illustrated, the cement pipe 10 is provided with a circular ring designated at 35 which is placed against the end of the pipe section 10. This ring has attached to it a cylindrical member 36 as by welding indicated at 37. This cylindrical member 36 is spaced apart from the outside of the pipe and extends over the end of the pipe a short distance, as shown. The ring 35 and cylindrical member 36 are held in proper relation to the pipe by means of a neat cement caulking as illustrated at 36'.

Extending forwardly from the ring 35 is a bell ring indicated at 38 which is secured to the ring 35 by means of welding indicated at 39. The outer end of the bell ring 38 is flared outwardly as indicated at 40 so that the bell ring will slip over the spigot ring hereinafter referred to. 42 indicates a metal flange which is adapted for connection to a valve or other structure. Welded to the flange 42 as indicated at 43 is a spigot ring 44, the outer end of which is received in the bell ring 38, being provided with a circumferential groove indicated at 45 to receive a resilient packing member or ring indicated at 46 which engages the inside of the bell ring 38. The flange 42 has an opening therein indicated at 50 of the same internal diameter as the pipe 10 and the inside of the bell ring 38 and spigot ring 44 is filled in with a cement mortar lining indicated at 51 finished internally to the same diameter as the inside of the pipe and the opening 50 through the flange 42.

It will be understood that prior to the filling in of the lining 51 the pipe has been moved so that the spigot ring 44 is received in the bell ring 38, as shown in Fig. 4 of the drawings. After the parts are in place a covering or cement mortar coating indicated at 53 is placed about the adapter consisting of the cylindrical member 36, ring 35 and bell ring 38 so as to form a protective covering for the adapter on the end of the pipe 10.

In both forms illustrated and described above it will be readily understood that the pipe may have some differential or unequal movement with relation to the structure to which it is attached by reason of the bell and spigot joint formed therebetween as above described without the customary cracking of the structure when such unequal movement is not compensated for. A very small relative movement between the two structures at the point of connection will allow a considerable movement of the pipe with relation to the structure at some distance from the pipe without disruption of the joint between the two structures and without any damage to the pipe which would otherwise be considered in such cases as a rigid connection is made between the pipe and other structure and no allowance made for the differential movement or settlement of one of the structures.

Although one form of the invention has been particularly shown and described, it is contemplated that various changes and modifications can be made without departing from the scope of the invention and it is intended to cover such changes and modifications as come within the scope of the claims.

I claim as my invention:

1. An adapter joint for connecting a concrete pipe to relative stationary structures comprising: an adapter member on the end of the pipe having a circular metal ring faced on the end of the pipe; a cylindrical ring on the circular ring extending over the end portion of the pipe and spaced apart therefrom adapted to receive caulking therebetween; a telescoping member on said circular ring; a telescoping member on the stationary structure; and a yieldable ring between the telescoping members.

2. An adapter joint for connecting a concrete pipe to relative stationary structures comprising: an adapter member on the end of the pipe having a circular metal ring faced on the end of the pipe; a cylindrical ring on the circular ring extending over the end portion of the pipe and spaced apart therefrom; caulking between said cylindrical ring and the pipe; an adapter member on the stationary structure having a cylindrical band; an outwardly extending circular flange secured to said cylindrical band embedded in the stationary structure; a bell ring on one of said adapter members; a spigot ring on the other of said adapter members; and yieldable packing means between the bell ring and the spigot ring.

3. An adapter joint for connecting a concrete pipe to relative stationary structures comprising: an adapter member on the end of the pipe having a circular metal ring faced on the end of the pipe; a cylindrical ring on the circular ring extending over the end portion of the pipe and spaced apart therefrom; caulking between said cylindrical ring and the pipe; one member of a bell and spigot joint on said adapter member; the other member of a bell and spigot joint on said stationary member; and a yieldable ring between the said bell and spigot members.

4. An adapter joint for connecting a concrete pipe to a relative stationary structure having a fluid opening therethrough comprising: an adapter member on the end of the pipe comprising, a flat circular ring faced on the end of the pipe and a cylindrical band on said circular ring extending over the end portion of the pipe spaced apart from the pipe; caulking between said cylindrical band and the pipe; an adapter member anchored in said stationary member about the fluid opening therein; a bell ring on one of said adapter members; a spigot ring on the other of said adapter members; and a resilient band between the bell and spigot rings.

5. Adapter means for use in providing a metal extension on the end of a concrete pipe, comprising a flat circular metal ring adapted to be faced on the end of the pipe, a cylindrical band on said ring of greater diameter than the pipe and adapted to extend over the end portion of the pipe spaced radially therefrom, caulking means between the band and the pipe, and a tubular metal extension on said ring radially inward of said band and on the side of said ring opposite to said band.

HAROLD L. WHITE.

REFERENCES CITED

The following references are of record in the file of this patent:

UNITED STATES PATENTS

| Number | Name | Date |
|---|---|---|
| 1,951,512 | Jewell | Mar. 20, 1934 |
| 2,265,328 | Trickey | Dec. 9, 1941 |

FOREIGN PATENTS

| Number | Country | Date |
|---|---|---|
| 840,751 | France | May 3, 1939 |